United States Patent
Adir et al.

(10) Patent No.: US 11,741,063 B2
(45) Date of Patent: Aug. 29, 2023

(54) DELETING AND INSERTING ROWS IN FULLY HOMOMORPHICALLY ENCRYPTED DATABASES USING QUEUES

(71) Applicant: International Business Machines Corporation, Armonk, NY (US)

(72) Inventors: Allon Adir, Kiryat Tivon (IL); Michael Mirkin, Haifa (IL); Ramy Masalha, Kafr Qari (IL); Omri Soceanu, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 22 days.

(21) Appl. No.: 17/507,339

(22) Filed: Oct. 21, 2021

(65) Prior Publication Data

US 2023/0129422 A1    Apr. 27, 2023

(51) Int. Cl.
*G06F 16/215* (2019.01)
*G06F 16/2455* (2019.01)
*G06F 21/62* (2013.01)
*G06F 21/60* (2013.01)
*G06F 16/22* (2019.01)

(52) U.S. Cl.
CPC ........ *G06F 16/215* (2019.01); *G06F 16/2282* (2019.01); *G06F 16/24552* (2019.01); *G06F 21/602* (2013.01); *G06F 21/6227* (2013.01)

(58) Field of Classification Search
CPC ............... G06F 16/215; G06F 16/2282; G06F 16/24552; G06F 21/602; G06F 21/6227
See application file for complete search history.

(56) References Cited

U.S. PATENT DOCUMENTS

| 5,870,760 A * | 2/1999 | Demers ............... G06F 16/2308 |
| 9,442,980 B1 | 9/2016 | Trepetin et al. |
| 2014/0156948 A1* | 6/2014 | Roberts ............... G06F 12/0811 |
| | | 711/143 |
| 2017/0344575 A1* | 11/2017 | Naylor ................ G06F 12/0813 |

OTHER PUBLICATIONS

Using the Maxwell Bootstrap Utility, pp. 1-3 (Year: 2019).*
Medforth, Nigel, Dan Lin, Kenneth Herdy, Rob Cameron and Arrvindh Shriraman. "icXML: Accelerating a Commercial XML Parser Using SIMD and Multicore Technologies.", pp. 1-33 (Year: 2013).*
Anonymous, "13.2.2 Delete Statement", MySQL 8.0 Reference Manual, https://dev.mysql.com/doc/refman/8.0/en/delete.html, Feb. 10, 2021, 7 pages.
Anonymous, "Best Practices for Deleting Data", vertica.com/kb/Best-Practices-for-Deleting-Data/Content/BestPractices/Best-Practices-for-Deleting-Data.htm, retrieved Feb. 10, 2021, 7 pages.

(Continued)

*Primary Examiner* — Albert M Phillips, III
(74) *Attorney, Agent, or Firm* — Barry D. Blount

(57) ABSTRACT

An example system includes a processor to receive, from a client device, a delete query requesting deletion of a row of in a fully homomorphically encrypted (FHE) database. The processor can store an identifier of the row to be deleted in a deletion queue, where the row is to be replaced with values of a row to be inserted from a received insertion query.

17 Claims, 12 Drawing Sheets

(56) References Cited

OTHER PUBLICATIONS

Bill Wilkins, "Tips for improving INSERT performance in DB2 Universal Database", Published Mar. 11, 2004, Updated Mar. 12, 2004, IBM Developer, https://developer.ibm.com/technologies/databases/articles/dm-0403wilkins/, 37 pages.

IBM, "When is space from a deleted row reused by DB2", Retrieved Feb. 10, 2021, https://www.ibm.com/support/pages/when-space-deleted-row-reused-db2, 2 pages.

Jaszymas et al., "Bulk load encrypted data to columns using Always Encrypted", Nov. 4, 2015, https://docs.microsoft.com/en-us/sql/relational-databases/security/encryption/migrate-sensitive-data-protected-by-always-encrypted?view=sql-server-ver15&viewFallbackFrom=sql-server-v%E2%80%A6, 4 pages.

Liu et al., "A Novel Secure Scheme for Supporting Complex SQL Queries over Encrypted Databases in Cloud Computing", Hindawi, Security and Communication Networks, vol. 2018, Article ID 7383514, https://doi.org/10.1155/2018/7383514, 16 pages.

Mell et al., "The NIST Definition of Cloud Computing", National Institute of Standards and Technology, U.S. Department of Commerce, Special Publication 800-145, 7 pages.

Youssef et al., "A Secure Database System using Homomorphic Encryption Schemes", DBKDA 2011: The Third International Conference on Advances in Databases, Knowledge, and Data Applications, ISBN: 978-1-61208-115-1, 6 pages.

\* cited by examiner

300

Table 202

| ID | Col1 | Col2 | Col3 |
|----|------|------|------|
| 1  | 124  | 1658 | 5079 |
| 2  | 5373 | 34   | 373  |
| 3  | 633  | 363  | 3463 |
| 4  | 8542 | 346  | 45   |
| 5  | 379  | 5463 | 4738 |

602 (IM)

| IM |
|----|
| 1  |
| 0  |
| 1  |
| 0  |
| 1  |

\*

604

| ID | Col1 | Col2 | Col3 |
|----|------|------|------|
| 1  | 124  | 1658 | 5079 |
| 0  | 0    | 0    | 0    |
| 3  | 633  | 363  | 3463 |
| 0  | 0    | 0    | 0    |
| 5  | 379  | 5463 | 4738 |

=

604

| ID | Col1 | Col2 | Col3 |
|----|------|------|------|
| 1  | 124  | 1658 | 5079 |
| 0  | 0    | 0    | 0    |
| 3  | 633  | 363  | 3463 |
| 0  | 0    | 0    | 0    |
| 5  | 379  | 5463 | 4738 |

+

606

| ID | C1 | C2 | C3 |
|----|----|----|----|
| 0  | 0  | 0  | 0  |
| 6  | 14 | 23 | 43 |
| 0  | 0  | 0  | 0  |
| 0  | 0  | 0  | 0  |
| 0  | 0  | 0  | 0  |

+

608

| ID | C1 | C2 | C3 |
|----|----|----|----|
| 0  | 0  | 0  | 0  |
| 0  | 0  | 0  | 0  |
| 0  | 0  | 0  | 0  |
| 7  | 11 | 9  | 88 |
| 0  | 0  | 0  | 0  |

=

610

| ID | C1  | C2   | C3   |
|----|-----|------|------|
| 1  | 124 | 1658 | 5079 |
| 6  | 14  | 23   | 43   |
| 3  | 633 | 363  | 3463 |
| 7  | 11  | 9    | 88   |
| 5  | 379 | 5643 | 4738 |

DELETING AND INSERTING ROWS IN FULLY HOMOMORPHICALLY ENCRYPTED DATABASES USING QUEUES

BACKGROUND

The present techniques relate to encrypted databases. More specifically, the techniques relate to performing operations on fully homomorphically encrypted (FHE) databases.

SUMMARY

According to an embodiment described herein, a system can include processor to receive, from a client device, a delete query requesting deletion of a row in a fully homomorphically encrypted (FHE) database. The processor can also further store an identifier of the row to be deleted in a deletion queue, wherein the row is to be replaced with values of a row to be inserted from a received insertion query.

According to another embodiment described herein, a method can include receiving, at a processor, a delete query requesting deletion of a row in a fully homomorphically encrypted (FHE) database. The method can further include storing, via the processor, an identifier of the row to be deleted in a deletion queue, wherein the row is to be replaced with values of a row to be inserted from a received insertion query.

According to another embodiment described herein, a computer program product for processing fully homomorphically encrypted (FHE) databases can include computer-readable storage medium having program code embodied therewith. The computer readable storage medium is not a transitory signal per se. The program code executable by a processor to cause the processor to receive a delete query requesting deletion of a row in a fully homomorphically encrypted (FHE) database. The program code can also cause the processor to store an identifier of the row to be deleted in a deletion queue, wherein the row is to be replaced with values of a row to be inserted from a received insertion query.

BRIEF DESCRIPTION OF THE SEVERAL VIEWS OF THE DRAWINGS

FIG. 6 is an example system replacing a batch of queued insertions with queued deletions;

DETAILED DESCRIPTION

Figure 1:
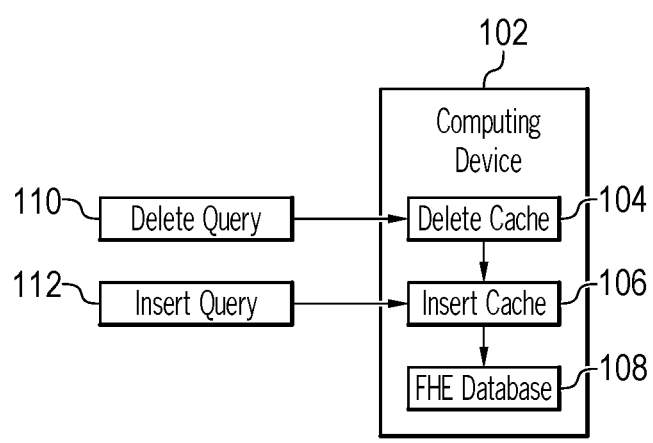
FIG. 1 is a block diagram of an example system for deleting and inserting rows in fully homomorphically encrypted databases.

Commercial databases may use encryption such as fully homomorphic encryption (FHE) to protect sensitive data. However, fully encrypted databases, such as those encrypted using FHE, may require significant overhead on memory for every record in the database. For example, every row in a FHE database may use 1000 times more space than the plaintext version of the underlying encrypted data would use in an unencrypted database. Furthermore, deletions in FHE DB cause memory leakage, thus increasing memory overhead and runtime of queries. Moreover, every additional record also adds to the runtime of every query processed on the database because the server must run in $\Omega(n)$ time inherently, where n is the number of records. If deleted rows are flagged, for security reasons, the server should not be able to distinguish a flagged row from a regular row. Thus, the FHE database server may run in $Q(n+k)$ where k is the number of flagged rows. In use cases where rows are often deleted, k can grow larger than n, and therefore significantly decreasing performance. In particular, the DB table grows in size because deleted rows are not reused. Following the size growth of the table, each query will accordingly take more time.

According to embodiments of the present disclosure, a system can include a processor to receive, from a client device, a delete query requesting deletion of a row in a fully homomorphically encrypted (FHE) database. The processor can store an identifier of the row to be deleted in a deletion queue, wherein the row is to be replaced with values of a row to be inserted from a received insertion query. Thus, embodiments of the present disclosure allow reusing deleted rows and therefore can lead to a significant reduction of time and space complexity. In addition, the actual deletion of records may happen only in a later stage and is done for batch of rows order to not increase noise. Similarly, in some embodiments, when a user inserts a new row, the inserted row is matched with one of the deleted rows and inserted to an insertion queue. As with deletion, the actual insertion is deferred to a later stage to reduce noise. Moreover, the embodiments enable the server to reuse recently deleted rows for the insertions, thus enhancing space and time complexity. In addition, the embodiments described herein allow queries to be executed with query results to include records that are not in any waiting list. For example, prior to execution of any deletion or insertion in the deletion queue or insertion queue, queries may be executed that exclude deleted values. Finally, in order to increase the chain index of the ciphertexts in the table and reduce noise in the data, the embodiments may include running an offline bootstrapping on the table and running a proposed computation to further reduce the noise generated by the deletions and insertions. In particular, the use of insert and delete caches allow inserting multiple rows at once, thus reducing the number of needed products, which in turn may reduce noise and chain index consumption. Thus, the embodiments enable deferring complicated computations offline and increasing the speed of overall online communication.

With reference now to FIG. 1, a block diagram shows an example system for deleting and inserting rows in fully homomorphically encrypted (FHE) databases. The example system is generally referred to by the reference number 100. FIG. 1 includes a computer device 102. For example, the computing device 102 may be a server device. The computing device 102 includes a delete cache 104, an insert cache 106, and a fully homomorphically encrypted (FHE) database 108. The system 100 includes a delete query 110 and an insert query 112, shown being received from an external source such as a client device (not shown).

In the example of FIG. 1, the system 100 is shown receiving a delete query 110 including a delete command for the computing device 102. In various examples, when a user sends a delete command to the server 102, the user may add an ID that is encrypted in one ciphertext and repeated in every slot. The server 102 then adds the deleted value to a queue, referred to herein as a deletion queue, that is stored in the deletion cache 104. In various examples, any suitable method of storing the representation of the deleted element may be used. In some examples, the deleted element may be stored using a compressed representation. For example, only a single value that represents the ID of the row designated for deletion. In some examples, the deleted element may be stored using a full representation. For example, the deleted element may be stored using an indicator vector with n elements corresponding to the number of rows in the table, and including a value of 1 for rows to be deleted and values of 0 elsewhere. In various examples, the compressed representation may be used to reduce memory consumption. However, the compressed representation may have an overhead because the deletion and insertion of elements to the table require the full representation, therefore a transition from compressed to full representation may requires n comparisons.

In various examples, the computing device 102 may also store a single indicator vector that combines all deleted elements. For example, the elements may be combined by adding the element together. The system 100 may use the combined indicator vector to exclude deleted elements from future queues by multiplying the logical not of this single indicator by any future indicator. In various examples, the system 100 can continuously update the combined indicator vector by adding the full representation of the newest deleted vector. In various examples, the client device may not delete previously deleted ID twice without first filling the row corresponding to the ID with a new element.

Still referring to FIG. 1, to insert a new element, the computing device 102 may receive an insert query 112 including a new encrypted row. The row to be inserted is matched with a previously deleted element in the delete queue of the delete cache 104. The computing device 102 then removes the matched element from the deleted elements queue and inserts both the deleted ID and the new row to the to-be inserted queue. In some examples, the deleted ID can be kept in compressed form as well as full form. A simple method of deleting a row may include the following: multiplying the row to be inserted by the indicator of its matched deleted row, multiplying the whole table by the logical not of the indicator of the deleted row, and adding the first product to the whole table. However, this simple method may introduce noise after every row insertion and the reduction of the chain index. Therefore, in various examples, the computing device 102 may alternatively insert the elements in groups as described herein. For example, regardless of whether one row or several rows are inserted at once, the noise and chain index of the table may be affected in the same way. In particular, this is because the computing device 102 multiplies all rows by 1 or 0, including rows that are not being deleted. In various examples, the computing device 102 can still run queries with the to-be inserted values by converting the to-be inserted values to a secondary table, applying the received query on both the original and secondary table, and aggregating the two results. In some examples, the secondary table may be only temporary, and when the data inserted to the original table, the computing device 102 may delete the secondary table. Thus, the system 100 can use secondary tables to avoid insertions of single rows.

In various examples, after aggregating a number of elements in the insertion queue of the insertion cache 106, the computing device 102 can insert the records at once into the FHE database 108 and delete the content of the insertion queue in the insert cache 106. In some examples, the exact threshold for maximal to-be inserted queue size may be based on available memory in the computing device 102. For example, if the size of the insertion queue is k and the size of the table is n, then the server will run over n+k elements to produce results for a query. Therefore, the size of insertion queue k may be based on available memory in the computing device 102.

In various examples, insertion may result in reducing the chain index of all the elements in the table of the FHE database 108 because the initial chain index is bounded by encryption parameters and security requirements. This may be true even when insertion happens rarely. This reduction of the chain index leads to a situation where the number of insertions is limited. In particular, one reason that insertion may result in reducing the chain index of the entire table, is that the computing device 102 may perform computations over all the records in the FHE database. This is also true for any FHE based solution, since no information of the records can be known. The encryption parameters and security requirements impose a limit for this depth, and thus the result is that the encryption parameters and security requirements also impose a limit on the number of inserted elements for the FHE database 108. This limit may hold true until the computing device 102 applies a bootstrap, which may bring the chain index up again and allow more future insertions. Therefore, in various examples, the computing device 102 may run a bootstrap for the entire table occasionally. Bootstrapping may have high complexity. However, because the computing device 102 runs the bootstrapping offline and the computing device 102 chooses the timing, the computing device 102 may execute the bootstrapping such that has almost no effect on the user.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional client devices, or additional resource servers, etc.).

Figure 2:
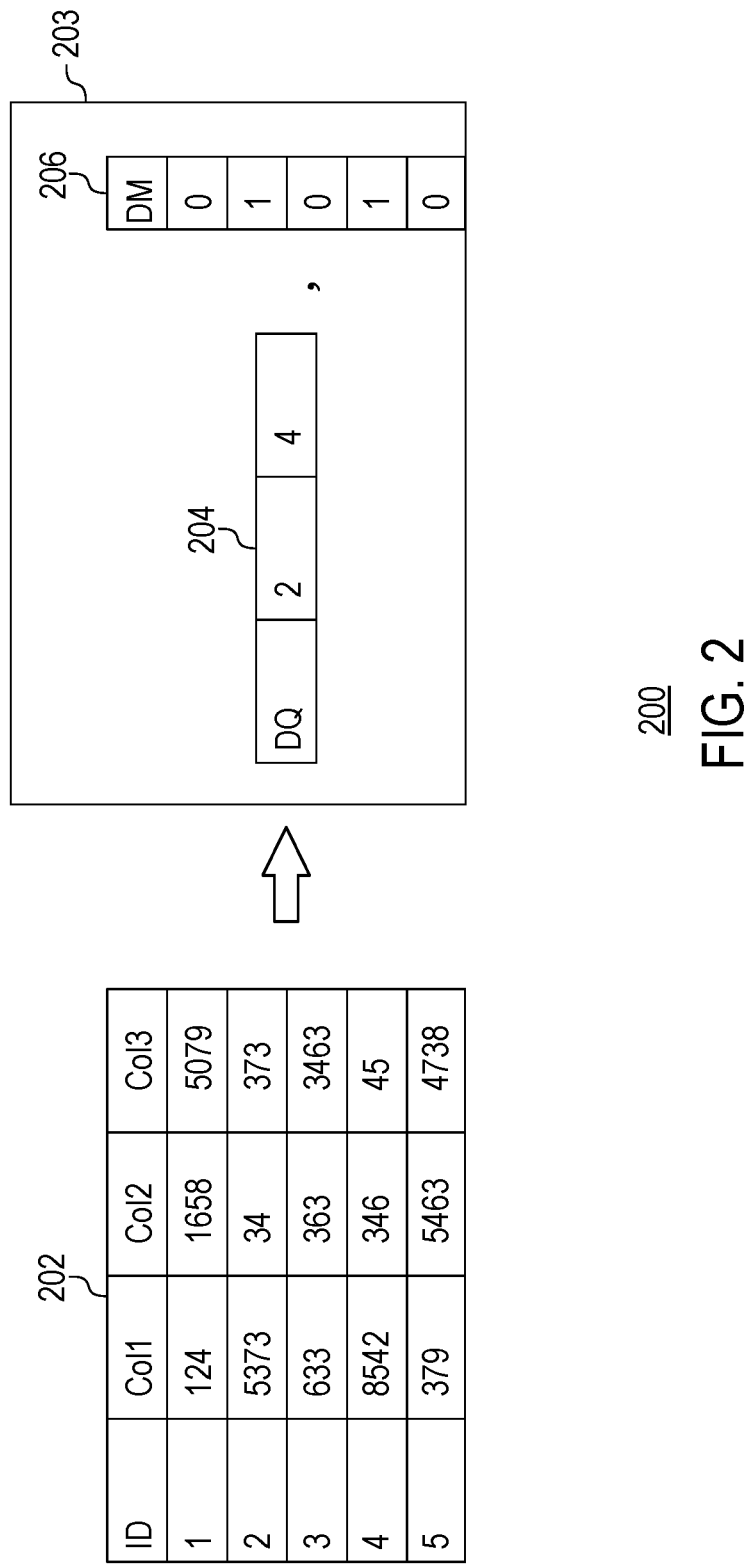
FIG. 2 is an example system for generating a deletion queue and deletion mask according to embodiments described herein.

FIG. 2 is an example system for generating a deletion queue and deletion mask according to embodiments described herein. The system 200 may be implemented using the processor 902 of computing device 900 or the processor 1202 of FIGS. 9 and 12, respectively.

The system 200 of FIG. 2 includes an example database table 202. For example, the database table 202 may include a column of identifiers. In some examples, the values of the identifiers may be encrypted. For example, the table 202 may be encrypted column by column. In some examples, the table 202 may be encrypted utilizing the single instruction, multiple data (SIMD) nature of an FHE scheme. Thus, a single ciphertext may include a number of elements of a column. Alternatively, the table 202 may not use SIMD ciphertexts. For example, each of the elements of the column may be encrypted using a different ciphertext. As one example, if a fast fully homomorphic encryption scheme over the torus (TFHE) encryption scheme is used, then each bit may be encrypted using a single ciphertext. The system 200 also includes a deletion cache 203 storing a deletion queue 204. For example, the deletion queue 204 includes two delete queries from one or more users. The deletion queue 204 includes identifier numbers for rows 2 and 4. The deletion cache 203 also further includes a deletion mask 206. The deletion mask 206 may include a column of binary values indicating rows to be deleted using a value of "1".

In the example of FIG. 2, one or more delete queries may be received requesting for the second row and fourth row of database 202 to be deleted. The rows requested to be deleted may be stored in a deletion queue 204. In the example of FIG. 2, rows 2 and 4 are shown accordingly as values in the deletion queue 204. In various examples, the values in the deleted queue may have been received as encrypted ciphertext or ciphertexts.

In various examples, the system 200 can generate the deletion mask 206 based on the deletion queue 204. For example, the system 200 can compare each of the IDs in the ID column of the table 202 with each of the received ciphertexts and generate a deletion mask 206. For every ID value that matches, the value for the corresponding row in the deletion mask 206 may be 1. For every ID value in the table 202 that does not match, the value of the corresponding row in the deletion mask 206 may be 0. In the example of FIG. 2, the comparisons between the ID column of table 202 and the ciphertexts in the deletion queue 204 may have revealed that the second and the fourth row of the table 202 is to be deleted. The values of rows 2 and 4 in the deletion mask 206 accordingly have a value of "1".

In some examples, the values in the delete mask 206 may alternatively be received from a client device (not shown). For example, the system 200 may receive both ciphertexts of encrypted ID values and indicators indicating rows to be deleted in the table 202.

It is to be understood that the block diagram of FIG. 2 is not intended to indicate that the system 200 is to include all of the components shown in FIG. 2. Rather, the system 200 can include fewer or additional components not illustrated in FIG. 2 (e.g., additional tables, queues, indicators, or additional masks, etc.).

Figure 3:
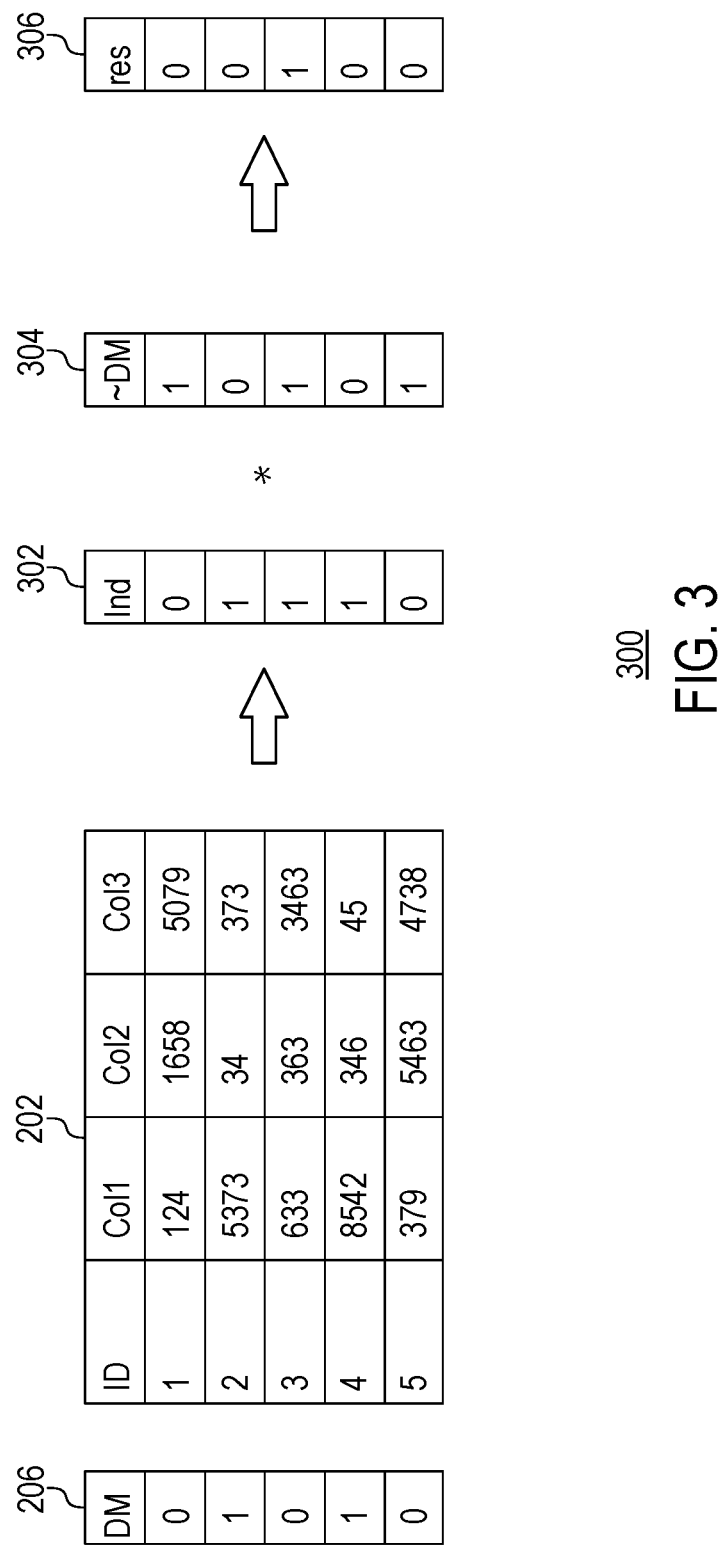
FIG. 3 is an example system for executing queries using a deletion mask according to embodiments described herein.

FIG. 3 is an example system for executing queries using a deletion mask. The system 300 may be implemented using the processor 902 of computing device 900 or the processor 1202 of FIGS. 9 and 12, respectively.

The system 300 includes a deletion mask 206 and database table 202. The system 300 further includes an indicator vector 302. For example, the indicator vector may indicate rows satisfying the conditions of a received query. The system 300 includes a negated deletion mask 304. For example, the negated deletion mask 304 may be the negation of the deletion mask 206. The system 300 also further includes a resulting indicator vector 306.

In various examples, any number of delete queries may have been received and cached prior to receiving the COUNT query. For example, the delete queries may have been cached and stored in the deletion mask 206. In the example of FIG. 3, the query received may be "COUNT*WHERE col1>600". In this example, the second, third, and fourth rows satisfy the condition of col1 having a value greater than 600. Thus, the system 300 can generate the indicator vector 302 based on the query to indicate that rows 2, 3, and 4 satisfy the received query. For example, the second row has a value of 5,373, the third row has a value of 633, and the fourth row has a value of 8,542, all of which are greater than the value 600. Thus, the system 300 can generate a value of 1 for each corresponding indicator in response to detecting a row that satisfies the condition of the query.

In some examples, the system 300 can then generate the negated deletion mask 304 based on the deletion mask 206. For example, the negated deletion mask 304 may be generated by calculating the negation of each row in the deletion mask 206. Thus, as shown in FIG. 3, given a deletion mask 206 with values [0,1,0,1,0], the negated deletion mask 304 may include the values [1,0,1,0,1].

In various examples, the system 300 can then multiply the indicator vector 302 by the negated deletion mask 304 to generate a resulting indicator vector 306. In the example of FIG. 3, the values of the resulting indicator 306 are [0, 0, 1, 0, 0] indicating that only row 3 is to be returned because rows two and four have been previously deleted. The resulting single row may be added to the COUNT query when summing together rows to be counted from multiple tables. For example, the result returned for the COUNT query may be 1 if the database table 202 is the only table being queried.

It is to be understood that the block diagram of FIG. 3 is not intended to indicate that the system 300 is to include all of the components shown in FIG. 3. Rather, the system 300 can include fewer or additional components not illustrated in FIG. 3 (e.g., additional rows to insert, queues, or additional indicators, etc.). For example, other types of queries may be received and processed using system 300. In various examples, such queries may include average, sum, and standard deviation queries.

Figure 4:
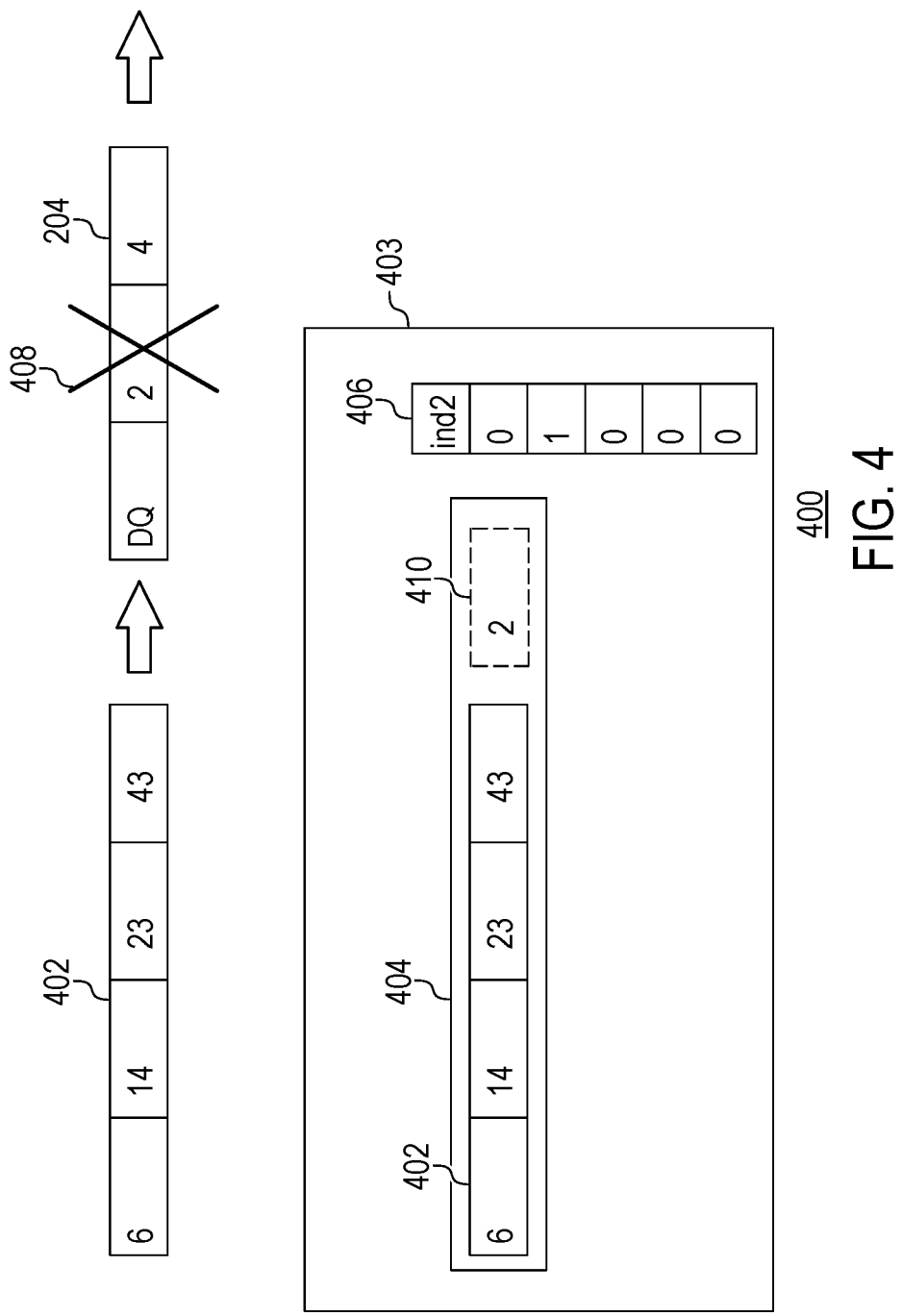
FIG. 4 is an example system for insertion of a row in place of a deleted row according to embodiments described herein.

FIG. 4 is an example system for insertion of a row in place of a deleted row according to embodiments described herein. The system 400 may be implemented using the processor 902 of computing device 900 or the processor 1202 of FIGS. 9 and 12, respectively.

The system 400 includes a row 402 to be inserted. The system 400 includes a deletion queue 204 including previously deleted rows. The system 400 also includes an insertion cache 403 storing an insertion queue 404. The insertion cache 403 also further includes an insertion indicator vector 406 indicating rows to be inserted. A cross out 408 indicates the removal of an ID from the deletion queue 204. The insertion queue 404 include an ID 410 corresponding to the ID removed from the deletion queue 204.

In the example of FIG. 4, a row 402 to be inserted into a table (not shown) may be received by the system 400. For example, the table may be table 202 of FIG. 2. In various examples, the system 400 can then retrieve a deletion queue 204 from a deletion cache (not shown) and select a deleted row to be replaced. The system 400 may then remove the replaced row from the deletion queue 204, as shown using a cross out 408.

In some examples, the insertion queue 404 including the row in which the insertion is to be made and the ID 410 of the row to be replaced may be used to execute the insertion. In the example of FIG. 2, the database table may then be updated with its updated second row now containing the values [6, 14, 23, 43]. Additional rows to be inserted may thus be received a processed similarly.

In various examples, the insertion queue 404 may alternatively be saved to an insertion cache (not shown) and executed together with additional insertions as a batch. In these examples, the system 400 can generate an insertion mask 406 with values indicating rows to be replaced using the saved insertion queue. For example, the rows indicated to be replaced may correspond to the IDs stored in the insertion queue. In the example of FIG. 4, the insertion indicator vector 406 includes values [0, 1, 0, 0, 0] indicating that the second row having an ID 410 of "2" is to be replaced. In various examples, the indicator vector 406 may also be stored in the insertion cache.

It is to be understood that the block diagram of FIG. 4 is not intended to indicate that the system 400 is to include all of the components shown in FIG. 4. Rather, the system 400 can include fewer or additional components not illustrated in FIG. 4 (e.g., additional rows to insert, queues, or additional indicators, etc.). For example, additional rows to insert may be received and stored in the insertion queue 404 as described in FIG. 5.

Figure 5:
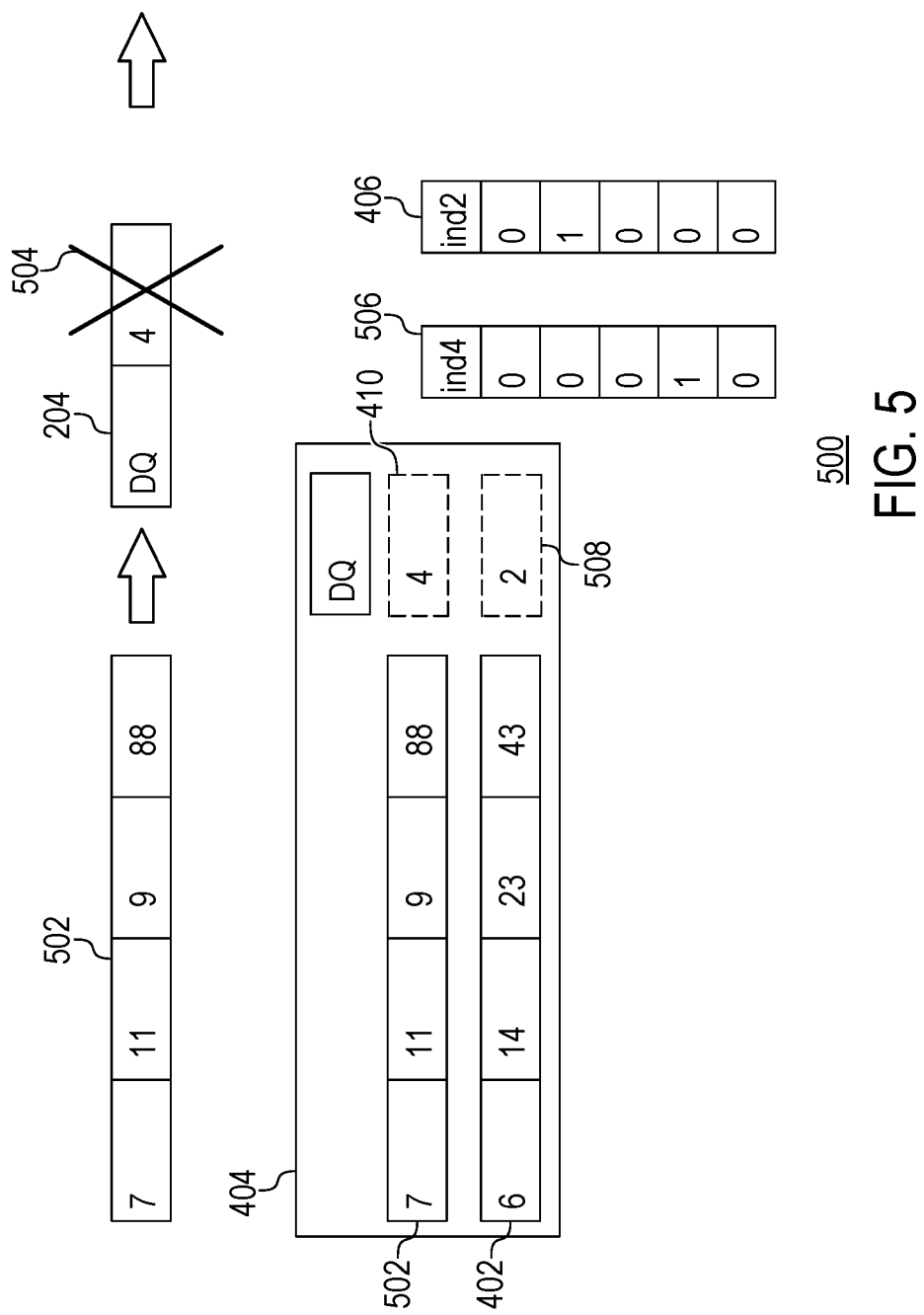
FIG. 5 is an example system for replacing a queued deletion with a queued batch of insertions.

FIG. 5 is an example system for replacing a cached deletion with a cached batch of insertions. The system 500 can be implemented using the processor 902 of computing device 900 or the processor 1202 of FIGS. 9 and 12, respectively.

The system 500 includes similarly referenced elements from FIGS. 2 and 4. The system 500 includes a row to be inserted 502. For example, the additional row 502 to be inserted may have been received after the row 402 in the insertion queue 404. The system 500 also includes a delete queue 204 with a row having an ID of "4" shown being removed from the queue, as indicated by a cross out 504. The system 500 also further includes an indicator vector 506 for the row to be inserted 502 in addition to the indicator vector 406 from FIG. 4. Furthermore, the system 500 includes an insert queue 404 with row 502 stored along with ID 508 corresponding to the row to be replaced in the database.

As similarly described in the system 400 of FIG. 4, the system 500 can access a delete queue from a delete cache 204 and select a first available row to be replaced. In the example of FIG. 5, only one row remains unused and therefore the system 500 can use that remaining row for inserting the new row 502. The system 500 may then update the delete cache 204 to remove the used row as indicated by the cross out 504.

In various examples, the system 500 may add the new row 502 to be inserted along with the ID 508 of the replacement row to be used for the insertion of row 502 into the insertion queue 404. For example, the system 500 may first check the deletion queue 204 for available rows to be replaced by the insertion 502. In the example of FIG. 5, the system 500 may determine that a row with ID of "4" remains available in the deletion queue 204. For example, the previous row with an ID of "2" may have been previously removed from the deletion queue 204 for the row 402 already present in the insertion queue 404. The system 500 may then remove the row with ID "4" from the delete queue as indicated by cross out 504. Thus, the delete queue 204 may then be empty, until additional delete queries are received. The system 500 can then store the ID 508 with value of "4" in front of the row 502 to be inserted in the insertion queue 404. In various examples, the indicator vector 506 corresponding to the row having ID 508 may also be stored in the insertion cache (not shown). In the example of FIG. 5, the indicator vector 506 has a value of "1" in the fourth row, indicating that the fourth row of the database table is to be replaced.

In some examples, the insert queue 404 and indicators 406 and 506 may be used to insert rows 402 and 502 into the rows of a database with IDs 410 and 508. For example, the values of the new rows 402 and 502 may be inserted in place of previous values of the second and fourth rows of the table in the database. An example bulk insert operation is described in greater detail with respect to FIG. 6.

It is to be understood that the block diagram of FIG. 5 is not intended to indicate that the system 500 is to include all of the components shown in FIG. 5. Rather, the system 500 can include fewer or additional components not illustrated in FIG. 5 (e.g., additional rows to insert, queues, or additional indicators, etc.). For example, additional rows to insert may be received and stored in the insertion queue 404, along with additional indicators. Similarly, additional delete queries may be received and stored in the delete queue, and further used for inserting the additional values in place of the values to be deleted. In various examples, the storage of additional indicator vectors may increase memory usage. Therefore, in some examples, the system 500 may not store indicators 406 and 506 in the insertion cache, and only store the IDs 410 and 508. The indicators 406 and 506 may then be generated on demand at the time of insertion of the rows 402 and 502. For example, at the time of insertion, the system 500 can compare the IDs 410 and 508 and generate an indicator for each of the IDs. Each of the generator indicators may include a value of 1 for the row in the table corresponding to the respective ID, and a value of "0" for each row in the table not containing the respective ID, as shown in the example indicators 406 and 506.

FIG. 6 is an example system replacing a batch of queued insertions with queued deletions. The system 600 can be implemented using the processor 902 of computing device 900 or the processor 1202 of FIGS. 9 and 12, respectively.

The system 600 of FIG. 6 includes similarly referenced elements from FIG. 2. For example, the table 202 may be a table of a database to be modified. The system 600 also includes an insertion mask 602 to be multiplied by the table 202 to result in the updated table 604. The system 600 further includes a set of tables 606 and 608 containing two separate rows to be inserted into the updated table 604. The system 600 includes a resulting updated table 610.

In the example of FIG. 6, the system 600 can update the table 202 of a database. For example, the system 600 can update the database 202 in response to detecting a that a number of rows to be inserted in the insertion queue exceeds a threshold. In the example of FIG. 6, the threshold may have been set to one insert. The system 600 may have detected that two inserts were present and thus greater than the threshold. Thus, the system 600 can insert the two rows in the insert queue together into the table of the database in response to detecting that the threshold of one insert is exceeded.

In various examples, the system 600 can insert the two rows by first multiplying the table 202 by an insert mask 602. In some examples, the insert mask 602 may be generated based on the indicators 406 and 506 of FIG. 5. For example, the indicators may be summed together and the negation of the summed vector may calculated to generate the insert mask 602. The insert mask 602 may thus have a value of "1" in for each row that is to be kept. The result may be a zeroed table 604 with rows to be replaced containing values of 0. In the example of FIG. 6, these are the second and fourth rows.

The system 600 can then add the new rows to be inserted into the zeroed table 604. For example, the system 600 can generate two tables 606 and 608 based on the indicators 406 and 506, respectively. For example, the system 600 can multiply each indicator by the values of the respective row to be inserted. In the example of FIG. 6, the result may be a first table 606 containing the values [6, 14, 23, 43] in the second row, and a second table 608 containing values 7, 11, 9, and 88 in the fourth row. In various examples, the system 600 can add tables 606 and 608 to table 604 to generate an updated table 610 containing the inserted rows. Thus, multiple rows may be inserted at one time, with less products consuming the chain index and less noise for the table. For example, the table 202 may only be multiplied by the insert mask 602 one time for multiple inserts, thus reducing use of the chain index.

Figure 7:
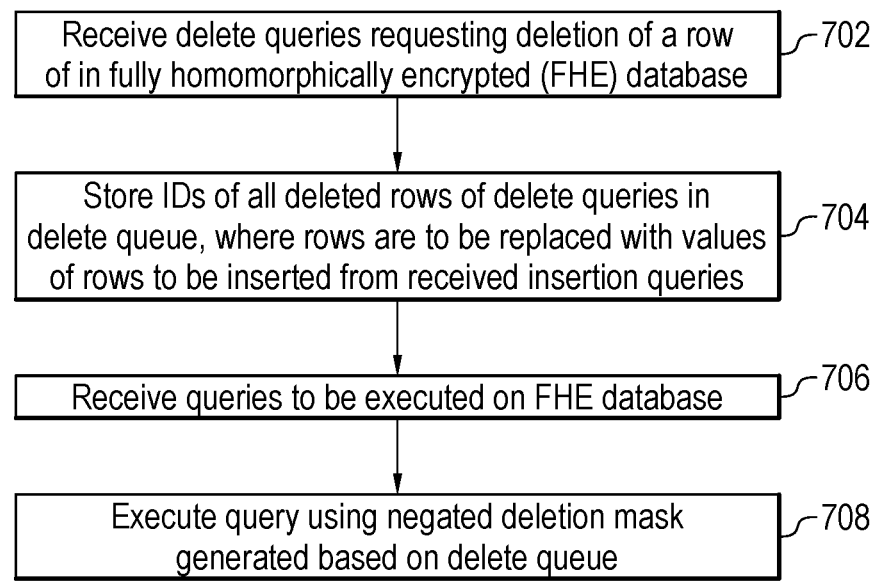
FIG. 7 is a block diagram of an example method that can delete rows and execute queries in fully homomorphically encrypted databases.

FIG. 7 is a process flow diagram of an example method that can delete rows and execute queries in fully homomorphically encrypted databases. The method 700 can be implemented with any suitable computing device, such as the computing device 900 of FIG. 9 and is described with reference to the systems 100 and 200 of FIGS. 1 and 2. In various examples, the methods described below can be implemented using the processor 902 of computing device 900 or the processor 1202 of FIGS. 9 and 12, respectively.

At block 702, a processor receives delete queries requesting deletion of rows in a fully homomorphically encrypted (FHE) database. For example, the delete queries may include an encrypted identifier of a specific row to be deleted.

At block 704, the processor stores an identifier of the rows to be deleted in a deletion queue. For example, the row stored in the deletion queue may be replaced with values of a row to be inserted from a received insertion query. In some examples, the processor can also receive a deletion mask from a client device and store the deletion queue and the deletion mask in a deletion cache.

At block 706, the processor receives queries to be executed on the FHE database. For example, the received queries may be SUM, COUNT, or any other type of queries.

At block 708, the processor executes the queries using a negated deletion mask generated based on the delete queue. For example, the processor can multiply the table with the negated deletion mask to remove results from the query corresponding to deleted elements of the table.

The process flow diagram of FIG. 7 is not intended to indicate that the operations of the method 700 are to be executed in any particular order, or that all of the operations of the method 700 are to be included in every case. Additionally, the method 700 can include any suitable number of additional operations.

Figure 8:
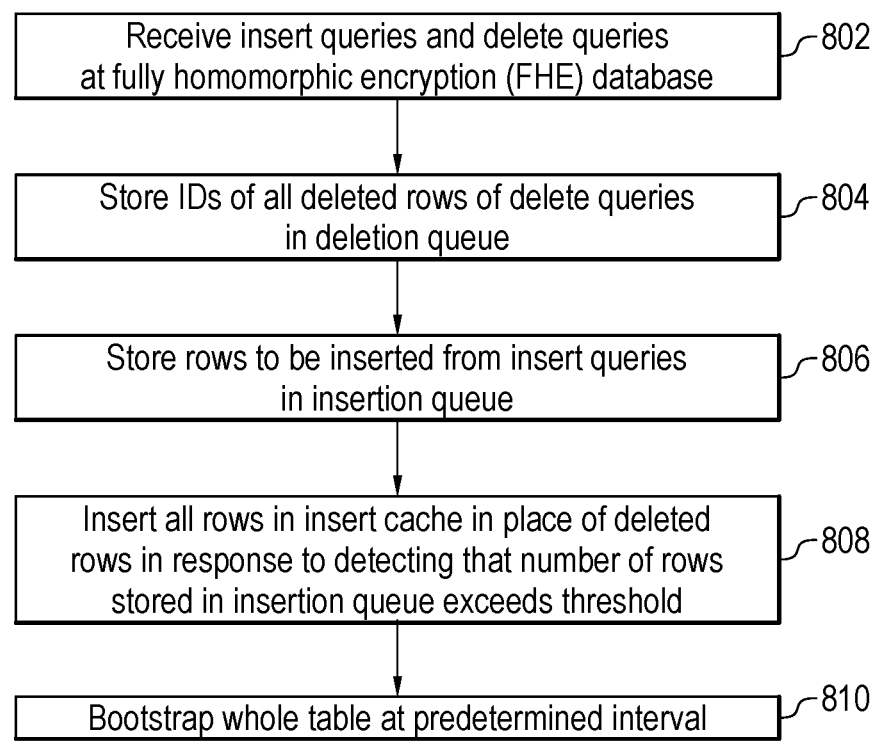
FIG. 8 is a process flow diagram of an example method that can delete and insert rows in fully homomorphically encrypted databases.

FIG. 8 is a process flow diagram of an example method that can delete and insert rows in fully homomorphically encrypted databases. The method 800 can be implemented with any suitable computing device, such as the computing device 900 of FIG. 9 and is described with reference to the systems 100-600 of FIGS. 1-6. In various examples, the methods described below can be implemented using the processor 902 of computing device 900 or the processor 1202 of FIGS. 9 and 12, respectively.

At block 802, a processor, receives insert queries and delete queries at a fully homomorphically encrypted (FHE) database. For example, the insert queries may include a row to be inserted into the FHE database. In some examples, the processor can also receive a deletion mask from a client device and store the deletion queue and the deletion mask in a deletion cache.

At block 804, the processor stores identifiers (IDs) of the row to be deleted in a deletion queue. For example, the deletion queue may be stored on a deletion cache.

At block 806, the processor stores the rows to be inserted in an insertion queue. For example, the insertion queue may be stored on an insertion cache.

At block 808, the processor inserts all rows stored inside the insertion queue in response to detecting that the number of rows stored in the insertion queue exceeds a threshold. In some examples, the processor can generate an indicator vector of a deleted row to be replaced with a particular row to be inserted based on the identifier of the deleted row in the insertion queue. For example, the indicator vector may be used to replace the row by multiplying the indicator vector with the table.

At block 810, the processor executes a bootstrapping of a table of the FHE database at predetermined intervals of time. For example, the processor may bootstrap the table every week. In various examples, the processor can bootstrap the tables at varying intervals. For example, instead of the bootstrapping time being predetermined, the processor can decide when to bootstrap in real-time. As one example, the processor can determine a bootstrap is to be executed in response to detecting that the chain index of the ciphertexts of the database falls below a certain threshold. As one examples, the threshold may be set to a value of "2".

The process flow diagram of FIG. 8 is not intended to indicate that the operations of the method 800 are to be executed in any particular order, or that all of the operations of the method 800 are to be included in every case. Additionally, the method 800 can include any suitable number of additional operations. For example, the method 800 may include receiving other queries after block 806 and before block 808. In various examples, the processor can execute such queries using a secondary table including inserted values.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
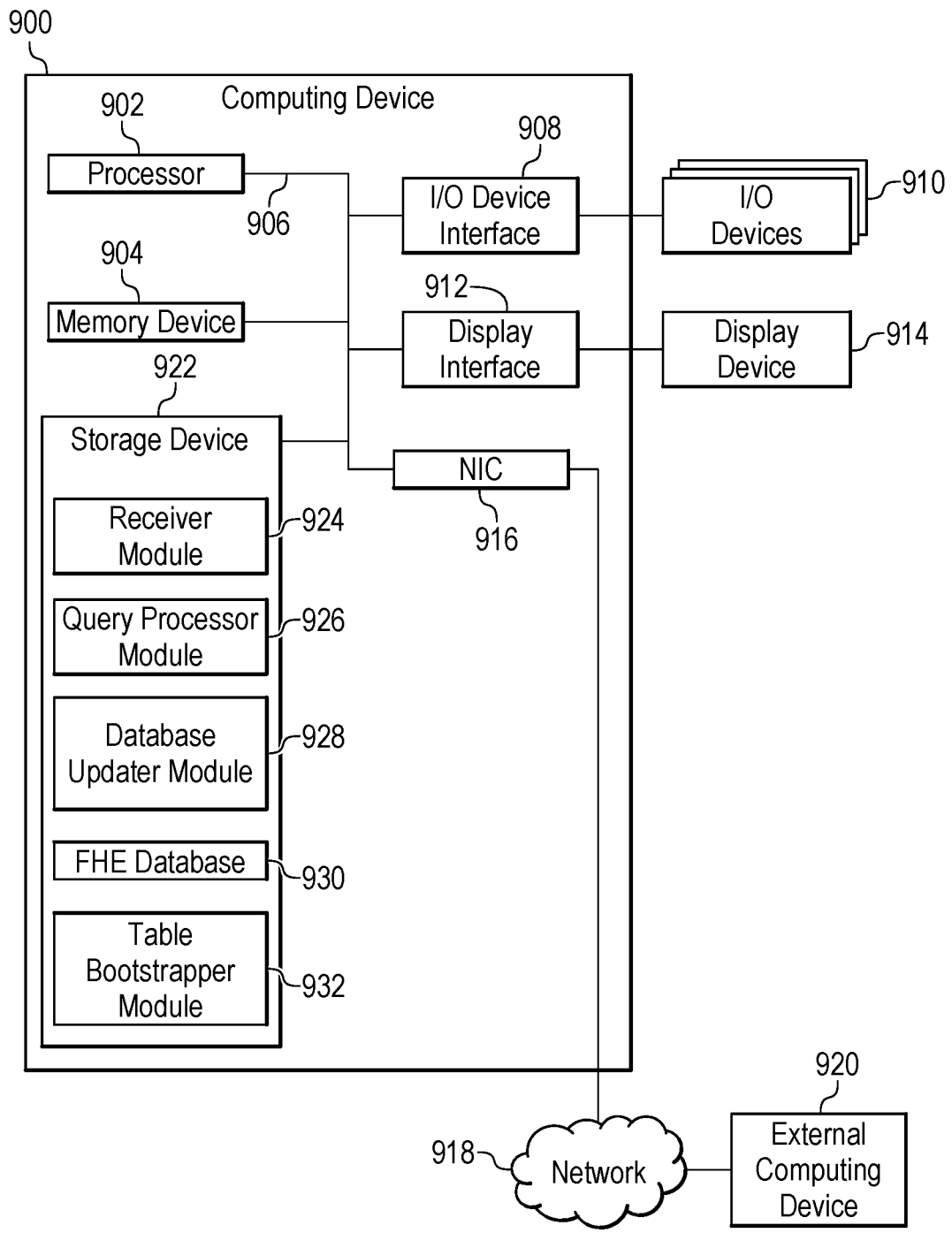
FIG. 9 is a block diagram of an example computing device that can delete and insert rows in fully homomorphically encrypted databases.

FIG. 9 is block diagram of an example computing device that can delete and insert rows in fully homomorphically encrypted databases. The computing device 900 may be for example, a server, desktop computer, laptop computer, tablet computer, or smartphone. In some examples, computing device 900 may be a cloud computing node. Computing device 900 may be described in the general context of computer system executable instructions, such as program modules, being executed by a computer system. Generally, program modules may include routines, programs, objects, components, logic, data structures, and so on that perform particular tasks or implement particular abstract data types. Computing device 900 may be practiced in distributed cloud computing environments where tasks are performed by remote processing devices that are linked through a communications network. In a distributed cloud computing environment, program modules may be located in both local and remote computer system storage media including memory storage devices.

The computing device 900 may include a processor 902 that is to execute stored instructions, a memory device 904 to provide temporary memory space for operations of said instructions during operation. The processor can be a single-core processor, multi-core processor, computing cluster, or any number of other configurations. The memory 904 can include random access memory (RAM), read only memory, flash memory, or any other suitable memory systems. In various examples, the memory device 904 may include a deletion cache to store the deletion queue and the deletion mask. In some examples, the memory device 904 may include an insertion cache to store an insertion queue of rows to be inserted into a table of the FHE database. For example, the insertion cache may include rows of values to be inserted in place of the values in the rows in the deletion queue and a column of IDs of rows to be replaced in the table of the database.

The processor 902 may be connected through a system interconnect 906 (e.g., PCI®, PCI-Express®, etc.) to an input/output (I/O) device interface 908 adapted to connect the computing device 900 to one or more I/O devices 910. The I/O devices 910 may include, for example, a keyboard and a pointing device, wherein the pointing device may include a touchpad or a touchscreen, among others. The I/O devices 910 may be built-in components of the computing device 900, or may be devices that are externally connected to the computing device 900.

The processor 902 may also be linked through the system interconnect 906 to a display interface 912 adapted to connect the computing device 900 to a display device 914. The display device 914 may include a display screen that is a built-in component of the computing device 900. The display device 914 may also include a computer monitor, television, or projector, among others, that is externally connected to the computing device 900. In addition, a network interface controller (NIC) 916 may be adapted to connect the computing device 900 through the system interconnect 906 to the network 918. In some embodiments, the NIC 916 can transmit data using any suitable interface or protocol, such as the internet small computer system interface, among others. The network 918 may be a cellular network, a radio network, a wide area network (WAN), a local area network (LAN), or the Internet, among others. An external computing device 920 may connect to the computing device 900 through the network 918. In some examples, external computing device 920 may be an external webserver 920. In some examples, external computing device 920 may be a cloud computing node.

The processor 902 may also be linked through the system interconnect 906 to a storage device 922 that can include a hard drive, an optical drive, a USB flash drive, an array of drives, or any combinations thereof. In some examples, the storage device may include a receiver module 924, a query processor module 926, a database updater module 928, a fully homomorphically encrypted (FHE) database 930, and a table bootstrapper module 832. The receiver module 924 can receive, from a client device, a delete query requesting deletion of a row of in a fully homomorphically encrypted (FHE) database. For example, the client device may be an external computing device 920. In some examples, the receiver module 924 can receive a deletion mask from the client device, where the system includes a deletion cache (not shown) to store the deletion queue and the deletion mask. In various examples, the receiver module 924 can also receive queries. The query processor module 926 can store an identifier of the row to be deleted in a deletion queue, wherein the row is to be replaced with values of a row to be inserted from a received insertion query. In some examples, the query processor module 926 can store the deletion queue and the deletion mask in a deletion cache. In some examples, the query processor module 926 can process a query on undeleted values using a negated deletion mask generated based on the deletion queue. In various examples, the query processor module 926 can receive and store a number of rows to be deleted in the deletion queue, and a number of received rows to be inserted in an insertion queue. The database updater module 928 can replace a row of a table in the FHE database specified in the deletion cache with the inserted row. The FHE database 930 can securely store values of rows. In various example, the database updater module 928 can replace the number of rows in the deletion queue with the rows in the insertion queue in response to detecting that the number of rows stored in the insertion queue exceeds a threshold. For example, the threshold may be based on a size of the memory device 904.

It is to be understood that the block diagram of FIG. 9 is not intended to indicate that the computing device 900 is to include all of the components shown in FIG. 9. Rather, the computing device 900 can include fewer or additional components not illustrated in FIG. 9 (e.g., additional memory components, embedded controllers, modules, additional network interfaces, etc.). For example, the storage device 922 may also include a deletion cache to store the deletion queue and the deletion mask. In some examples, the storage device 922 may further include an insertion cache to store an insertion queue of rows to be inserted into a table of the FHE database. Furthermore, any of the functionalities of the receiver module 924, the query processor module 926, and the database updater module 928, and the table bootstrapper module 832, may be partially, or entirely, implemented in hardware and/or in the processor 902. For example, the functionality may be implemented with an application specific integrated circuit, logic implemented in an embedded controller, or in logic implemented in the processor 902, among others. In some embodiments, the functionalities of the receiver module 924, the query processor module 926, and the database updater module 928, and the table bootstrapper module 832 can be implemented with logic, wherein the logic, as referred to herein, can include any suitable hardware (e.g., a processor, among others), software (e.g., an application, among others), firmware, or any suitable combination of hardware, software, and firmware.

Figure 10:
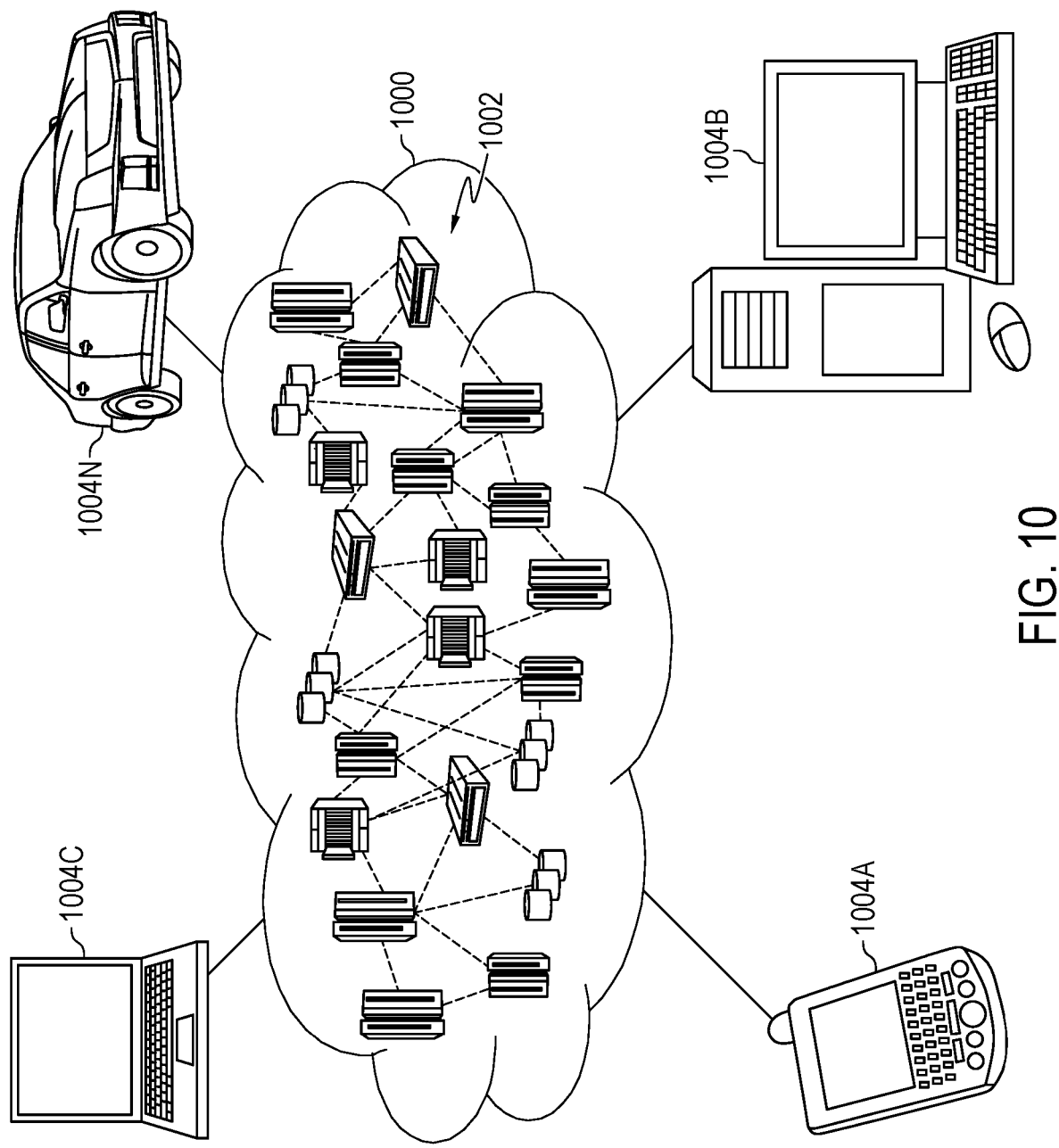
FIG. 10 is a diagram of an example cloud computing environment according to embodiments described herein.

Referring now to FIG. 10, illustrative cloud computing environment 1000 is depicted. As shown, cloud computing environment 1000 includes one or more cloud computing nodes 1002 with which local computing devices used by cloud consumers, such as, for example, personal digital assistant (PDA) or cellular telephone 1004A, desktop computer 1004B, laptop computer 1004C, and/or automobile computer system 1004N may communicate. Nodes 1002 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1004A-N shown in FIG. 10 are intended to be illustrative only and that computing nodes 1002 and cloud computing environment 1000 can communicate with any type of computerized device over any type of network and/or network addressable connection (e.g., using a web browser).

Figure 11:
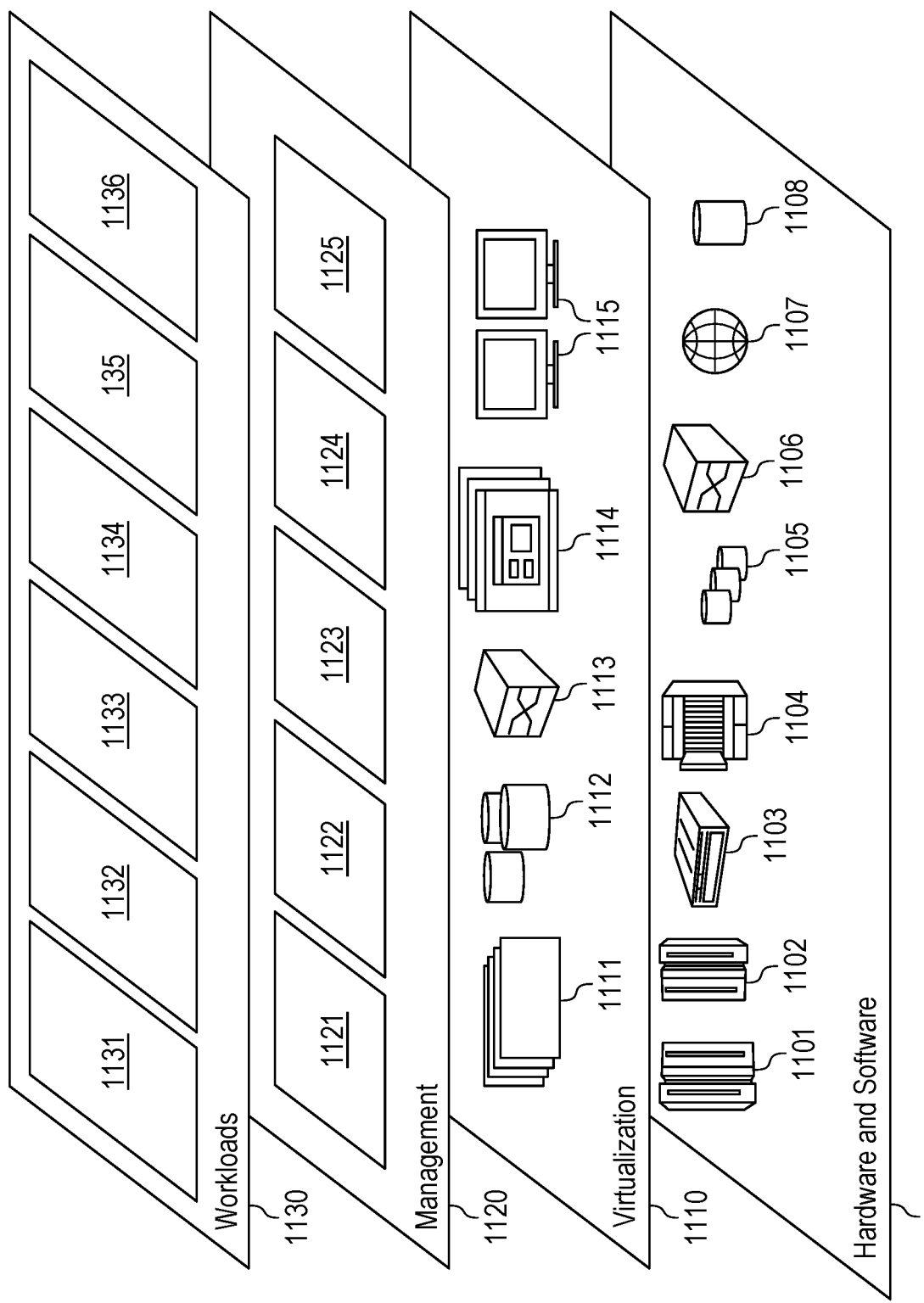
FIG. 11 is a diagram of an example abstraction model layers according to embodiments described herein.

Referring now to FIG. 11, a set of functional abstraction layers provided by cloud computing environment 1000 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1100 includes hardware and software components. Examples of hardware components include: mainframes 1101; RISC (Reduced Instruction Set Computer) architecture based servers 1102; servers 1103; blade servers 1104; storage devices 1105; and networks and networking components 1106. In some embodiments, software components include network application server software 1107 and database software 1108.

Virtualization layer 1110 provides an abstraction layer from which the following examples of virtual entities may be provided: virtual servers 1111; virtual storage 1112; virtual networks 1113, including virtual private networks; virtual applications and operating systems 1114; and virtual clients 1115.

In one example, management layer 1120 may provide the functions described below. Resource provisioning 1121 provides dynamic procurement of computing resources and other resources that are utilized to perform tasks within the cloud computing environment. Metering and Pricing 1122 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1123 provides access to the cloud computing environment for consumers and system administrators. Service level management 1124 provides cloud computing resource allocation and management such that required service levels are met. Service Level Agreement (SLA) planning and fulfillment 1125 provide pre-arrangement for, and procurement of, cloud computing resources for which a future requirement is anticipated in accordance with an SLA.

Workloads layer 1130 provides examples of functionality for which the cloud computing environment may be utilized. Examples of workloads and functions which may be provided from this layer include: mapping and navigation 1131; software development and lifecycle management 1132; virtual classroom education delivery 1133; data analytics processing 1134; transaction processing 1135; and delete query processing 1136.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 12:
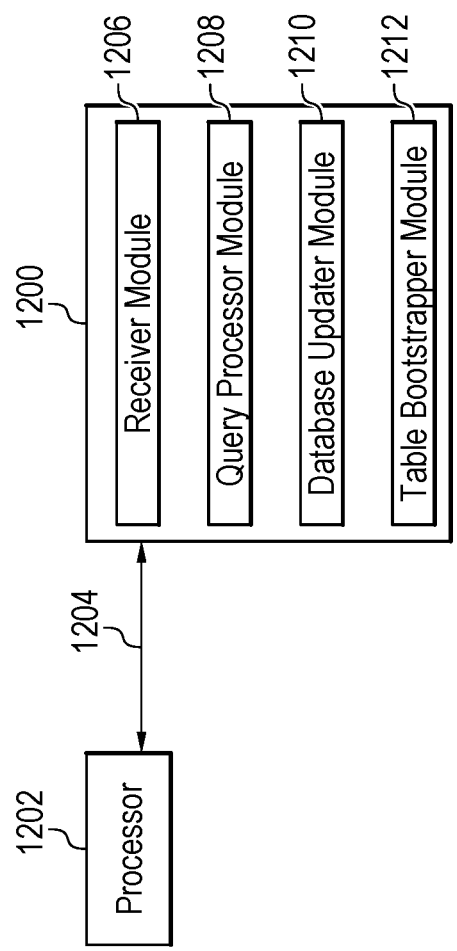
FIG. 12 is an example tangible, non-transitory computer-readable medium that can delete and insert rows in fully homomorphically encrypted databases.

Referring now to FIG. 12, a block diagram is depicted of an example tangible, non-transitory computer-readable medium 1200 that can delete and insert rows in fully homomorphically encrypted databases. The tangible, non-transitory, computer-readable medium 1200 may be accessed by a processor 1202 over a computer interconnect 1204. Furthermore, the tangible, non-transitory, computer-readable medium 1200 may include code to direct the processor 1202 to perform the operations of the methods 700 and 800 of FIGS. 7 and 8.

The various software components discussed herein may be stored on the tangible, non-transitory, computer-readable medium 1200, as indicated in FIG. 12. For example, a receiver module 1206 includes code to receive a delete query requesting deletion of a row in a fully homomorphically encrypted (FHE) database. The receiver module 1206 also includes code to receive a query to be executed on the FHE database. In some examples, the receiver module 1206 includes code to receive an insert query including a row to be inserted into the FHE database. In some examples, the receiver module 1206 includes code to receive a deletion mask from a client device. A query processor module 1208 includes code to store an identifier of the row to be deleted in a deletion queue. For example, the row is to be replaced with values of a row to be inserted from a received insertion query. The query processor module 1208 further includes code to store rows to be inserted in an insertion queue. The query processor module 1208 also includes code to store deletion queues and the deletion masks in a deletion cache. A database updater module 1210 includes code to execute queries using a negated deletion mask generate based on the deletion queue. The database updater module 1210 also includes code to insert all rows stored inside the insertion queue in response to detecting that the number of rows stored in the insertion queue exceeds a threshold. A table bootstrapper module 1212 includes code to execute a bootstrapping of a table of the FHE database at predetermined intervals of time.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 12 may be included within the tangible, non-transitory, computer-readable medium 1200, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
   receive, from a client device, a delete query requesting deletion of a row in a fully homomorphically encrypted (FHE) database; and
   store an identifier of the row to be deleted in a deletion queue;
   receive a query to be executed on the FHE database;
   generate a negated deletion mask based on the delete queue; and
   execute the query using the negated deletion mask.

2. The system of claim 1, wherein processor is to receive a deletion mask from the client device, wherein the system comprises a deletion cache to store the deletion queue and the deletion mask.

3. The system of claim 1, wherein the processor is to receive a row to be inserted and replace a row of a table in the FHE database specified in a deletion cache with the inserted row.

4. The system of claim 1, wherein the processor is to receive and store a plurality of rows to be deleted in the deletion queue, and a plurality of received rows to be inserted in an insertion queue, and replace the plurality of rows in the deletion queue with the rows in the insertion queue in response to detecting that a number of rows stored in the insertion queue exceeds a threshold.

5. The system of claim 1, wherein the system comprises an insertion cache to store an insertion queue of rows to be inserted into a table of the FHE database.

6. The system of claim 5, wherein the insertion cache comprises a row of values to be inserted in place of values in a row in the deletion queue and a column of IDs of rows to be replaced in the table of the database.

7. A computer-implemented method, comprising:
   receiving, at a processor, a delete query requesting deletion of a row in a fully homomorphically encrypted (FHE) database;
   storing, via the processor, an identifier of the row to be deleted in a deletion queue;
   receiving, via the processor, a query to be executed on the FHE database;
   generating, via the processor, a negated deletion mask based on the delete queue; and
   executing, via the processor, the query using the negated deletion mask.

8. The computer-implemented method of claim 7, comprising:
   receiving, at the processor, an insert query comprising a row to be inserted into the FHE database; and
   storing, via the processor, the row to be inserted in an insertion queue.

9. The computer-implemented method of claim 8, comprising inserting, via the processor, all rows stored inside the insertion queue in response to detecting that a number of rows stored in the insertion queue exceeds a threshold.

10. The computer-implemented method of claim 7, comprising receiving, via the processor, a deletion mask from a client device and storing the deletion queue and the deletion mask in a deletion cache.

11. The computer-implemented method of claim 7, comprising generating, via the processor, an indicator vector of a deleted row to be replaced with a particular row to be inserted based on the identifier of the deleted row in an insertion queue.

12. The computer-implemented method of claim 7, comprising executing, via the processor, a bootstrapping of a table of the FHE database at predetermined intervals of time.

13. A computer program product for processing fully homomorphically encrypted (FHE) databases, the computer program product comprising a computer-readable storage medium having program code embodied therewith, the program code executable by a processor to cause the processor to:
   receive a delete query requesting deletion of a row in a fully homomorphically encrypted (FHE) database;
   store an identifier of the row to be deleted in a deletion queue;
   receive a query to be executed on the FHE database;
   generate a negated deletion mask based on the delete queue; and
   execute the query using the negated deletion mask.

14. The computer program product of claim 13, further comprising program code executable by the processor to:
   receive an insert query comprising a row to be inserted into the FHE database; and
   store the row to be inserted in an insertion queue.

15. The computer program product of claim 13, further comprising program code executable by the processor to insert all rows stored inside an insertion queue in response to detecting that a number of rows stored in the insertion queue exceeds a threshold.

16. The computer program product of claim 13, further comprising program code executable by the processor to receive a deletion mask from a client device and store the deletion queue and the deletion mask in a deletion cache.

17. The computer program product of claim 13, further comprising program code executable by the processor to execute a bootstrapping of a table of the FHE database at predetermined intervals of time.

* * * * *